United States Patent [19]

Gosnell et al.

[11] Patent Number: 5,425,070
[45] Date of Patent: Jun. 13, 1995

[54] NUCLEAR FUEL ASSEMBLY INSERT ALIGNMENT TOOL

[75] Inventors: James S. Gosnell, Orland Park; David C. Graves, Morris, both of Ill.

[73] Assignee: Commonwealth Edison Company, Chicago, Ill.

[21] Appl. No.: 279,039

[22] Filed: Jul. 22, 1994

[51] Int. Cl.[6] ............................................. G21C 19/00
[52] U.S. Cl. ..................................... 376/260; 376/262
[58] Field of Search ............... 376/260, 261, 262, 264, 376/268, 271

[56] References Cited

U.S. PATENT DOCUMENTS

| | | | |
|---|---|---|---|
| 3,937,332 | 2/1976 | Flessner et al. | 376/262 |
| 4,434,092 | 2/1984 | Mary | 376/260 |
| 4,650,606 | 3/1987 | Yamamoto | 376/260 |
| 4,723,359 | 2/1988 | Blissell et al. | 376/261 |
| 4,793,962 | 12/1988 | Tsitsichvili | 376/261 |
| 4,968,477 | 11/1990 | Savinell et al. | 376/261 |
| 4,981,640 | 1/1991 | Beneck et al. | 376/261 |
| 5,227,125 | 7/1993 | Beneck et al. | 376/260 |
| 5,325,408 | 6/1994 | Hornak et al. | 376/260 |

*Primary Examiner*—Daniel D. Wasil
*Attorney, Agent, or Firm*—Emrich & Dithmar

[57] ABSTRACT

Apparatus for engaging and aligning lower ends of rodlets, or pins, of a nuclear fuel assembly insert. The apparatus facilitates positioning the insert within guide tubes of a nuclear fuel assembly. The nuclear fuel assembly insert rodlet alignment apparatus includes a mounting rack for attachment to a reactor or spent fuel pool edge, a first fixed plate attached to the mounting rack's lower end, and a second sliding plate attached to the first fixed plate. The first and second plates are respectively provided with first and second comb structures each comprised of elongated, linear, pointed teeth arranged in a spaced manner along an edge of a generally flat plate. The lower end of a crank, or rotating shaft, is coupled to the sliding plate by means of suitable linkage permitting the sliding plate to be moved on the fixed plate between a first position wherein the two comb structures are non-overlapping and a second position wherein the two comb structures overlap. The fuel insert pins are first inserted into the fixed plate comb structure, with the sliding plate comb structure then moved into overlapping position with the first comb structure such that each pin is engaged and securely maintained in fixed position by adjacent pairs of teeth of the first and second orthogonally aligned comb structures to prevent misalignment and entanglement of the lower ends of the pins. The fuel assembly insert may then be pulled up into a conventional handling tool with the pins still aligned.

16 Claims, 4 Drawing Sheets

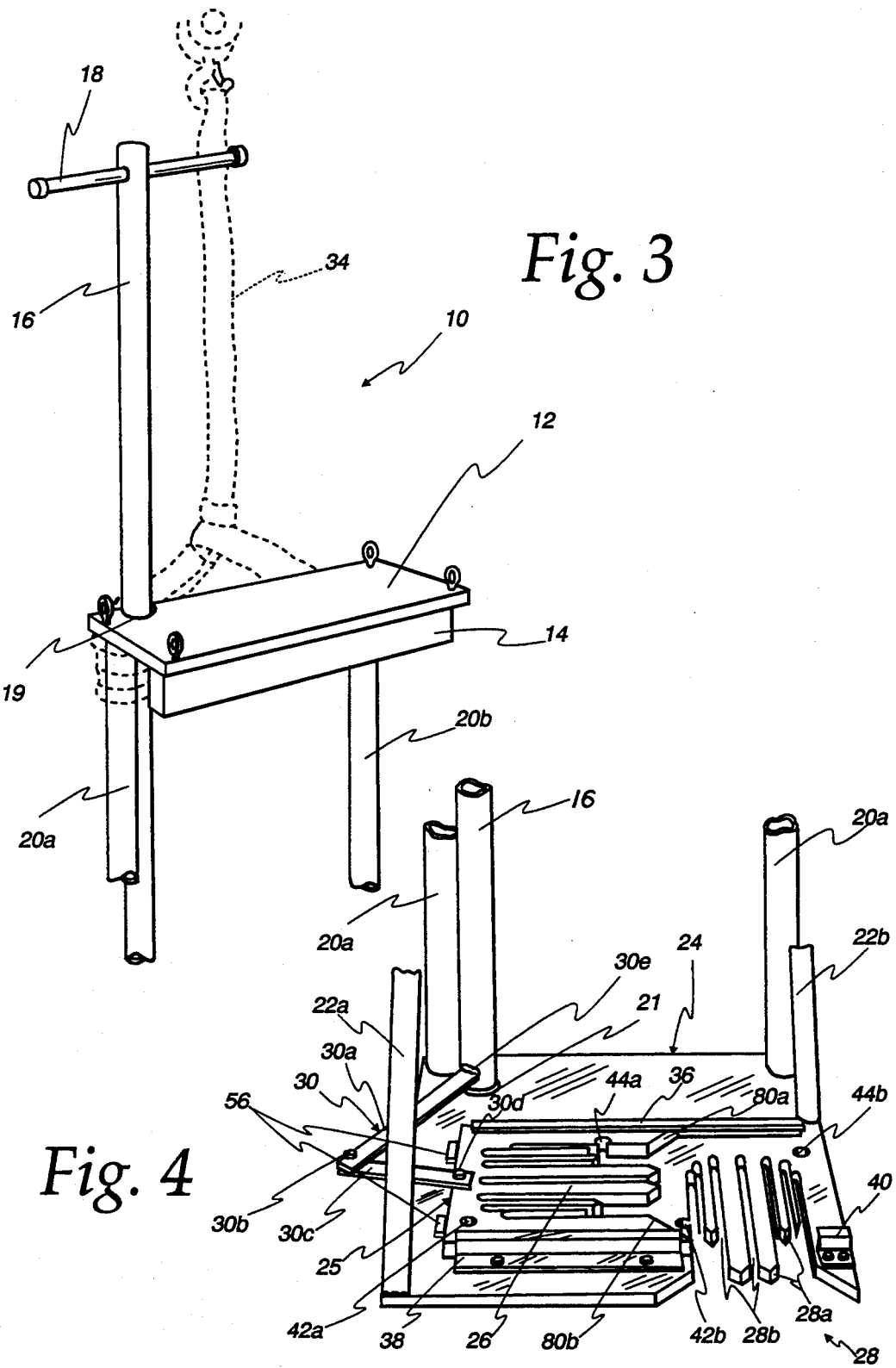

NUCLEAR FUEL ASSEMBLY INSERT ALIGNMENT TOOL

FIELD OF THE INVENTION

This invention relates generally to apparatus for handling fuel assemblies used in a nuclear reactor and is particularly directed to a nuclear fuel assembly insert alignment tool.

BACKGROUND OF THE INVENTION

Nuclear fuel for Pressurized Water Reactors (PWRs) is fabricated into fuel assemblies about 12 inches square and 12 feet long. Fissile material in the form of uranium dioxide ($UO_2$) pellets are stacked within long tubular fuel rods. The fuel rods are themselves arranged in bundles called nuclear fuel assemblies in a square spacing lattice. The fuel rod bundles are in the reactor, forming the reactor core. A few of the fuel rods are left as empty tubes, so that nuclear fuel assembly inserts can be placed within the fuel assembly. Different types of nuclear fuel assembly inserts include Rod Cluster Control Assemblies (RCCAs), Burnable Poison Rod Assemblies (BPRAs), and thimble plugs. The RCCAs, also known as control rods, control the reactor power level. The BPRAs, also known as burnable absorber rods, deplete over an operating cycle to improve fuel utilization. The thimble plugs block empty tubes to improve coolant flow patterns.

The inserts are geometrically similar in their upper portion, but differ in material composition and length. The upper portion is in the form of a central hub sometimes made of radiating spokes. The insert pins, also known as rodlets, are suspended from the hub so as to align the rodlets with the empty tubes in the fuel assembly. The lower ends of the rodlets are unattached and thus freely suspended. The RCCAs and BPRAs are approximately the length of the fuel assembly, while thimble plugs are typically a fraction of the fuel assembly length. A typical fuel assembly will be used for three (3) fuel cycles while many inserts are used for only one cycle (18 months).

After irradiation and exposure to elevated temperatures during the cycle the rodlets can become bowed. Reinserting a fuel assembly insert with bowed rods within a fuel assembly becomes difficult, if not impossible. Also, the unattached lower ends of the rodlets can become entangled and misaligned if released. In reinserting a nuclear fuel assembly insert within the fuel assembly, it is important that the individual rods not become tightly wedged against the guide tubes within the assembly which would make subsequent removal difficult, if not impossible. Moreover, after removal from the nuclear fuel assembly, the assembly inserts are typically stored in a spent fuel pool within spent nuclear fuel assemblies. In order to minimize the volume occupied by each nuclear fuel assembly insert and to accommodate a larger number of spent nuclear fuel assemblies, the inserts must be reinserted and stored in the spent fuel assemblies.

The present invention addresses the aforementioned problems encountered in the prior art by providing a nuclear fuel assembly insert alignment tool which may be manually operated by a single worker for aligning the lower ends of a plurality of fuel assembly insert rodlets and securely maintaining the rodlets in a closely spaced, matrix array for either storage or insertion in a fuel assembly.

OBJECTS AND SUMMARY OF THE INVENTION

Accordingly, it is an object of the present invention to facilitate handling of a nuclear fuel assembly insert during and after refueling of a nuclear reactor.

It is another object of the present invention to provide for the alignment of the rodlets, or pins, of a nuclear fuel assembly insert to facilitate insertion of the fuel assembly insert in the guide tubes of a nuclear fuel assembly or for storage of the fuel assembly insert such as in a spent fuel pool.

Yet another object of the present invention is to provide a tool operable by a single worker for maintaining a number of bowed rodlets, or pins, of a nuclear fuel assembly insert in common alignment to facilitate refueling of a nuclear reactor.

A still further object of the present invention is to reduce the volume of nuclear fuel assembly inserts so as to increase the storage capacity of a spent fuel pool in which the nuclear fuel assemblies are stored.

Another object of the present invention is to facilitate storage of a nuclear fuel assembly insert to avoid burying these contaminated and activated inserts and the costs associated therewith.

This invention contemplates apparatus for aligning rodlets of a nuclear fuel assembly insert, wherein the rodlets are suspended from a support hub and are arranged in a matrix array, the apparatus comprising: a frame; a first fixed comb structure attached to a lower end of the frame and including a plurality of parallel, elongated, linear first teeth arranged in a spaced manner for receiving the matrix array of rodlets, wherein each of the first teeth is disposed intermediate two or more of the rodlets; a second movable comb structure attached to a lower end of the frame and including a plurality of parallel, elongated, linear second teeth arranged in a spaced manner for receiving the matrix array of rodlets, wherein each of the second teeth is disposed intermediate two or more of the rodlets, and wherein the first and second teeth are oriented generally transversely; control means attached to an upper portion of the frame and coupled to the second movable comb structure for displacing the second comb structure between a first position wherein the first and second comb structures are non-overlapping and the second teeth are removed from the matrix array of teeth and a second position wherein the first and second comb structures are overlapping each of the first and second teeth are disposed intermediate two or more of the rodlets, and each of the rodlets is maintained in fixed position relative to the other rodlets by adjacent pairs of first and second teeth.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a perspective view of an upper portion of the nuclear fuel assembly insert alignment tool of the present invention illustrating the manner in which it is engaged by a support member for moving the insert alignment tool;

FIG. 4 is a perspective view of a lower portion of the nuclear fuel assembly insert alignment tool;

DETAILED DESCRIPTION OF THE PREFERRED EMBODIMENTS

Figure 1:
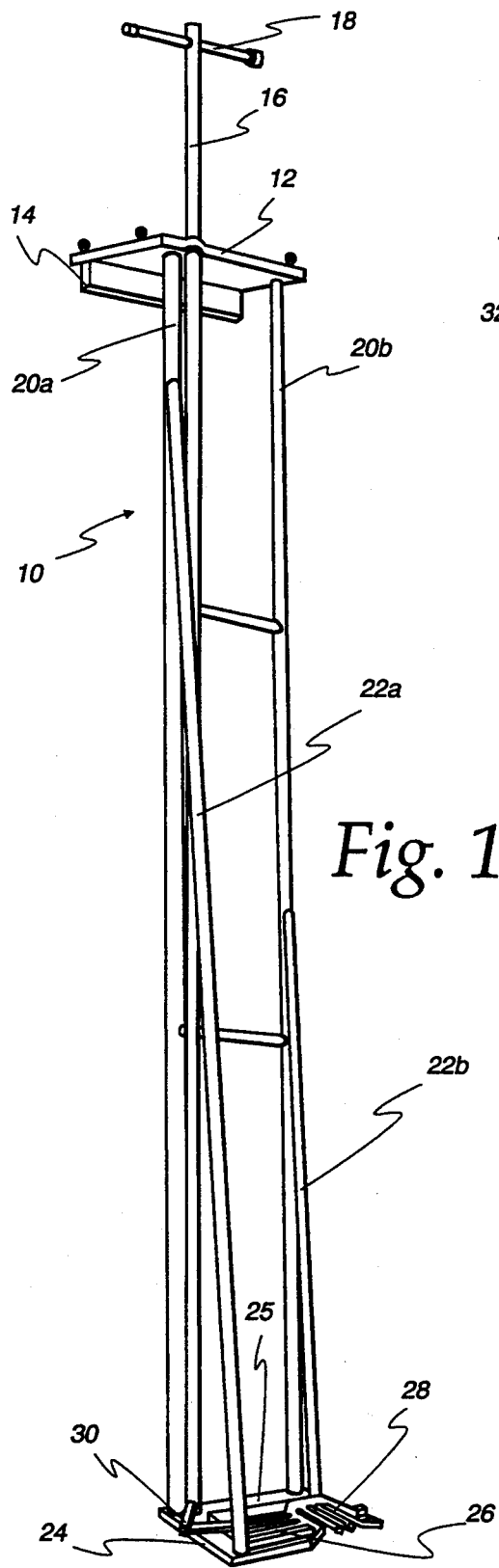
FIG. 1 is a perspective view of a nuclear fuel assembly insert alignment tool in accordance with the principles of the present invention.
Figure 2:
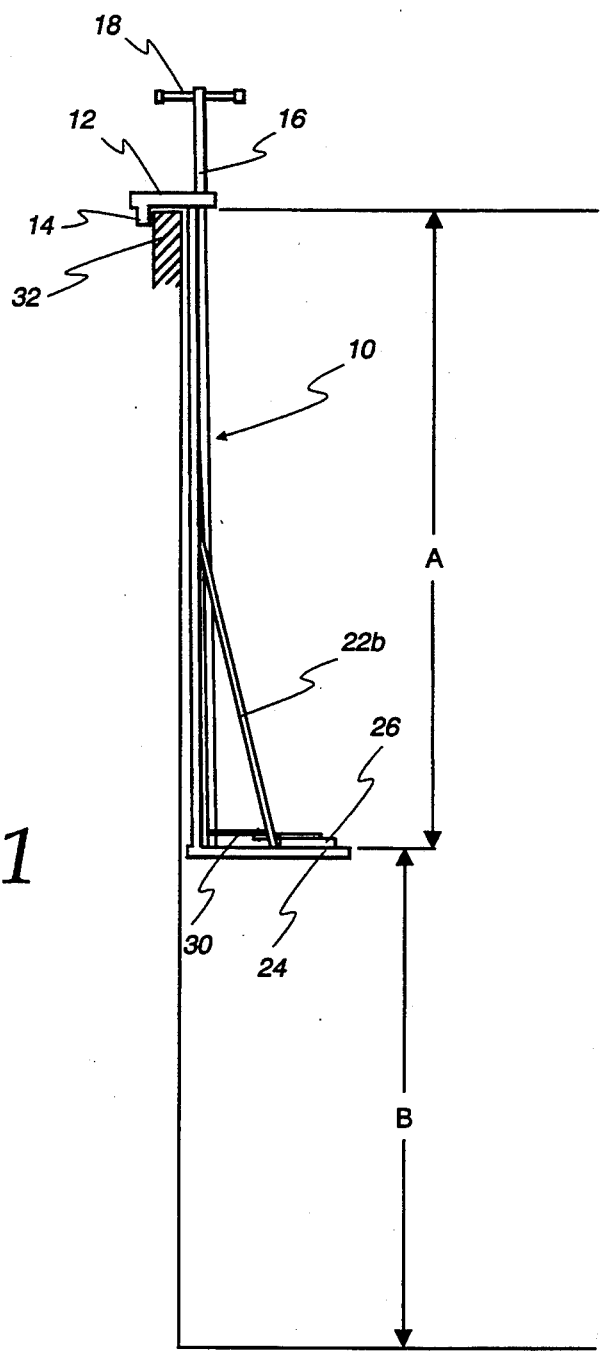
FIG. 2 is a side elevation view of the nuclear fuel assembly insert alignment tool of the present invention positioned in a spent fuel storage pool.

Referring to FIG. 1, there is shown a perspective view of a nuclear fuel assembly insert alignment tool 10 in accordance with the present invention. The insert alignment tool 10 includes a frame having an upper mounting bracket 12 and a lower fixed plate 24 which are coupled together to form a rigid structure by means of first and second support pipes 20a and 20b. Support pipes 20a, 20b are on the order of 25 feet in length to accommodate the length of the rodlets in a typical nuclear fuel assembly insert and maintain sufficient water cover for radiation shielding. The insert alignment tool 10 is shown suspended from the wall 32 of a spent fuel pool in the side elevation view of FIG. 2. As stated, the typical length A of the insert alignment tool 10 is on the order of 25 feet, with the distance B in a typical spent fuel pool being on the order of 15 feet. Attached to a lower surface of the tool's mounting bracket 12 is a positioning bracket 14 which is adapted for engaging an outer surface of the spent fuel pool's wall 32 for securely maintaining the insert alignment tool 10 and a nuclear fuel assembly with inserts (not shown) with which it is employed securely in position in a spent fuel pool. Positioning bracket 14 is affixed to the lower surface of mounting bracket 12 by conventional means such as weldments.

Insert alignment tool 10 further includes an elongated, cylindrical shaft, or crank, 16 extending through mounting bracket 12 and attached at a lower end thereof to the fixed plate 24. Rotating shaft 16 includes a handle 18 at the upper end thereof and is provided with appropriate bearings 19 and 21 in the mounting bracket 12 and fixed plate 24 to facilitate its rotational displacement in response to a manual movement by a worker turning the handle. The lower end of rotating shaft 16 is pivotally coupled to the fixed plate 24 by bearing 21. FIG. 3 is perspective view of an upper portion of the insert alignment tool 10 including its mounting bracket 12 illustrating the manner in which a support member 34 (shown in dotted line form) such as a high strength line may be wrapped around the first and second support pipes 20a and 20b for lifting the insert alignment tool.

Figure 5:
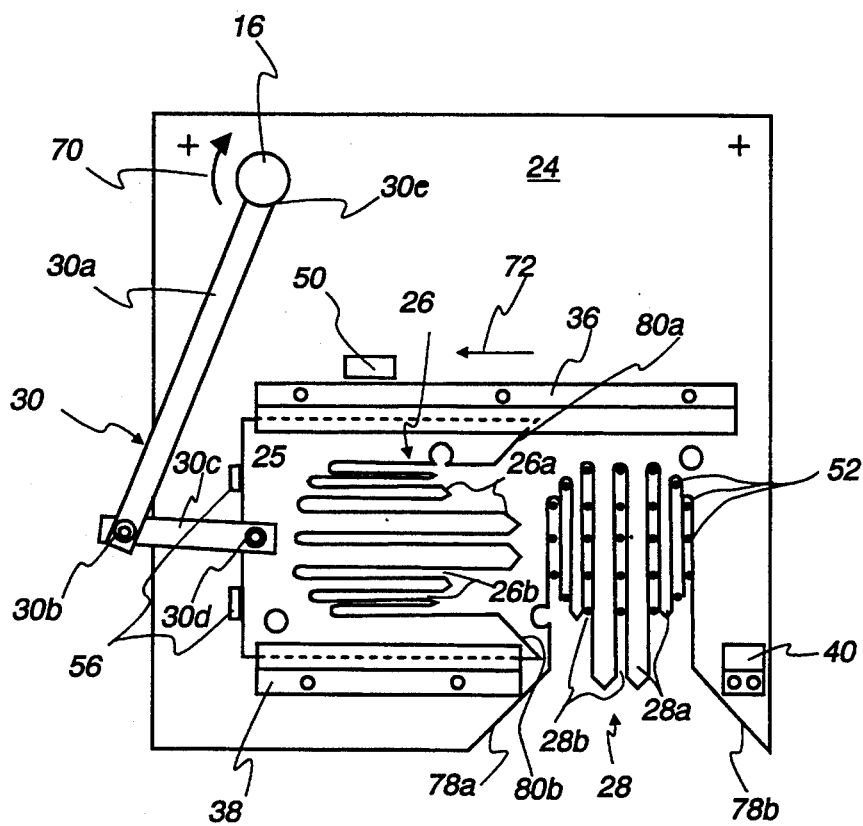
FIGS. 5 and 6 are plan views of the lower end portion of the nuclear fuel assembly insert alignment tool respectively illustrating the insert alignment tool's two rodlet engaging comb structures in the non-overlapping and overlapping positions.
Figure 6:
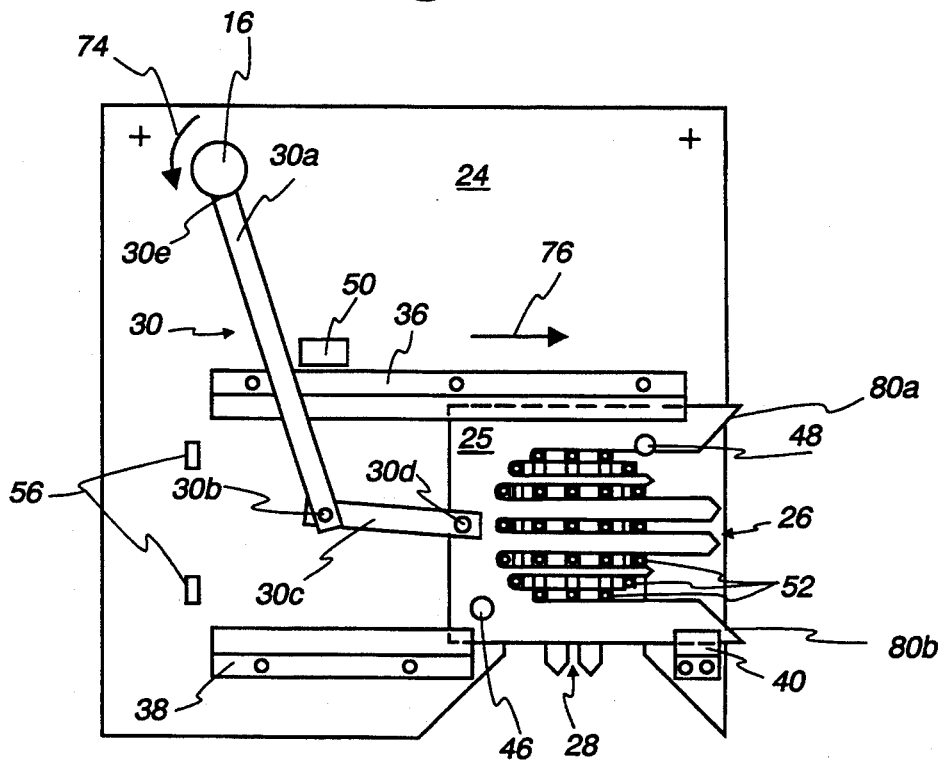

Referring to FIG. 4, there is shown a perspective view of the lower portion of the insert alignment tool 10 including its fixed plate 24. FIGS. 5 and 6 are top plan views of the insert alignment tool's fixed plate 24 showing a movable plate 25 respectively in the full open and full closed positions. Drive linkage 30 connects the lower end of rotating shaft 16 to movable plate 25 and includes a pivoting arm 30a and a coupling bracket 30c pivotally connected together by means of a coupling pin 30b. The proximal end of pivoting arm 30a is attached to the lower end of the rotating shaft 16 by means of weldment 30e, while the proximal end of coupling bracket 30c is connected to the movable plate 25 by means of a coupling pin 30d. Movable plate 25 is disposed on the upper surface of fixed plate 24 and is maintained in position thereon by means of a first alignment bracket 36 engaging a first lateral edge of the movable plate and second and third alignment brackets 38 and 40 engaging a second, opposed edge of the movable plate. Each of the first, second, and third alignment brackets 36, 38 and 40 is securely attached to the upper surface of the fixed plate 24 by means of screws or bolts and allow the movable plate 25 to slide on the fixed plate's upper surface. When shaft 16 is rotated in a clockwise direction as shown by the direction of arrow 70 in FIG. 5, the movable plate 25 is displaced in the direction of arrow 72 to the fully retracted position as shown in the figure. When the movable plate 25 is moved leftward in the direction of arrow 72 to the fully retracted position, an edge of the plate engages a pair of retraction stop brackets 56 mounted to the upper surface of the fixed plate 24. When shaft 16 is rotated in a counterclockwise direction as shown by the direction of arrow 74 in FIG. 6, the movable plate 25 is displaced in the direction of arrow 76 to the closed position as shown in the figure. Continued counterclockwise rotation of shaft 16 results in pivoting arm 30a of drive linkage 30 engaging an extension stop bracket 50 mounted to the upper surface of the fixed plate 24. This limits rightward displacement of the movable plate 25 and ensures that it is in the fully closed position as shown in FIG. 6.

As shown in FIGS. 4, 5 and 6, movable plate 25 includes a first comb structure 26 having a plurality of elongated, linear, pointed teeth 26a with a space, or gap, 26b disposed between adjacent teeth. Similarly, fixed plate 24 includes a second comb structure 28 also comprised of a plurality of teeth 28a separated by spaces 28b. The inner set of teeth within each of the first and second comb structures 26, 28 are longer and wider than the outer teeth. Fixed plate 24 further includes a pair of bevelled edges 78a and 78b disposed adjacent the second comb structure 28, while movable plate 25 similarly includes a pair of bevelled edges 80a and 80b disposed adjacent the first comb structure 26.

Disposed in movable plate 25 are a pair of first locking apertures 42a and 44a, while disposed in fixed plate 24 are a pair of second locking apertures 42b and 44b. With movable plate in the fully closed position as shown in FIG. 6, first and second locking pins 46 and 48 may be inserted through aligned apertures 42a, 42b and 44a, 44b, respectively. With locking pins 46, 48 inserted through aligned pairs of apertures in the fixed and movable plates 24, 25, the rodlets 52 are maintained in fixed relative position in a locked manner.

The nuclear fuel assembly insert alignment tool 10 is used with a nuclear fuel assembly insert having a plurality of spaced rodlets suspended therefrom in the following manner. A matrix array of rodlets 52 of a nuclear fuel assembly insert are first positioned adjacent the alignment tool's fixed plate 24. Fixed plate 24 is then urged into engagement with the rodlets 52 so that linear arrays of rodlets are received into each of the spaces 28b between adjacent teeth 28a in the second comb structure 28. The rodlets 52 are arranged in a general matrix array as shown in FIG. 5 which illustrates the second comb structure 28 as fully enclosing the array of rodlets. The pointed ends of teeth 28a as well as the first and second bevelled edges 78a and 78b leading into the second comb structure 28 facilitate positioning of the rodlets within the second comb structure even when the rodlets are entangled and misaligned. The two innermost teeth in the comb structure 28 are longer than the outer teeth which permits the center row of rodlets 52 to be initially aligned and received by the first comb structure followed by alignment between the shorter teeth of the outer rows of rodlets. Next, the movable plate 25 is displaced leftward in the direction of arrow 76 by means of the rotating shaft 16 so that the rodlets 52 are further positioned in the spaces 26b between adjacent teeth 26a in the first comb structure 26. This is shown in FIG. 6, where the movable plate 25 is illustrated in the fully closed position so as to completely overlap the second comb structure 28 in fixed plate 24. In this configuration, each of the rodlets 52 is securely maintained in fixed relative position by the respective teeth in the first and second comb structures 26, 28. The rodlets 52 are prevented from becoming misaligned and entangled by this overlapping comb arrangement and the space occupied by the rodlets is minimized to facilitate their insertion into the guide tubes of a nuclear fuel assembly for their storage in a spent fuel pool.

Figure 7:
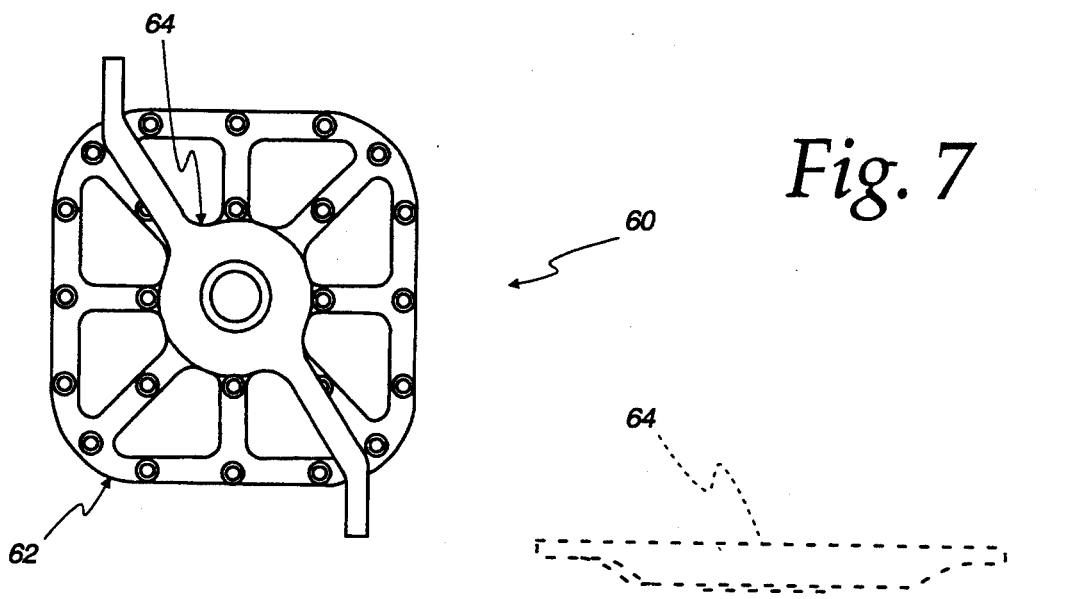
FIG. 7 is a top plan view of a burnable poison rod assembly with which the nuclear fuel assembly insert alignment tool of the present invention is intended for use.
Figure 8:
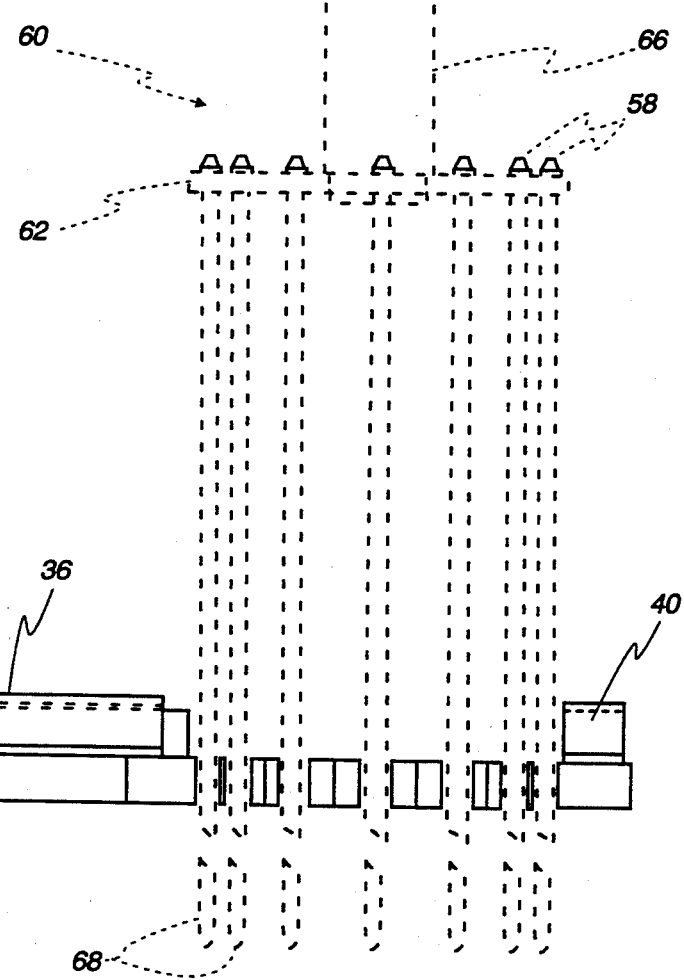
FIG. 8 is a partial side elevation view illustrating the cooperation between the nuclear fuel assembly insert alignment tool and the rodlets of a burnable poison rod assembly used in a nuclear reactor.

Referring to FIG. 7, there is shown a top plan view of a burnable poison rod assembly 60 with which the nuclear fuel assembly insert alignment tool of the present invention is intended for use. The engagement of the rodlets 68 of the burnable poison rod assembly 60 by the nuclear fuel assembly insert alignment tool 10 of the present invention is shown in the side elevation view of FIG. 8, where the burnable poison rod assembly is shown in dotted line form. The burnable poison rod assembly 60 includes an upper frame 64 from which is suspended by means of a connecting shaft 66 a spoked attachment hub 62. Each of the rodlets 68 is securely suspended from the attachment hub 62 by means of a respective connector 58. As shown in the figure, the insert alignment tool's fixed plate 24 is disposed adjacent the upper end of the rodlets 68 for preparing to maintain the rodlets in alignment. In FIG. 8, the movable plate 25 is shown in the fully retracted position prior to movement to the closed position for engaging the rodlets 68. The lower part of the rodlets are aligned by raising the insert after closing the movable plate.

There has thus been shown a nuclear fuel assembly insert alignment tool for engaging and aligning the rodlets, or pins, of a nuclear fuel assembly insert and maintaining the rodlets in fixed relative position for storage in a spent fuel pool via insertion into the guide tubes of a nuclear fuel assembly. The insert alignment tool allows a single worker to align the rodlets in a fixed, matrix array and is adapted for use with virtually any conventional nuclear fuel assembly insert such as a Rod Cluster Control Assembly, Burnable Poison Rod Assembly, or a thimble plug. The insert alignment tool is of simple construction, affords reliable operation, and can be used with even badly bowed rodlets in the nuclear fuel assembly. If a rodlet is damaged or bowed beyond use, the tool can still be used after removing the unusable rodlet with an underwater cutting tool.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for aligning rodlets of a nuclear fuel assembly insert, wherein said rodlets are suspended from a support hub and are arranged in a matrix array, said apparatus comprising:
   a frame;
   a first fixed comb structure attached to a lower end of said frame and immovable relative to said frame and including a plurality of parallel, elongated, linear first teeth arranged in a spaced manner for receiving the matrix array of rodlets, wherein each of said first teeth is disposed intermediate two or more of said rodlets;
   a second movable comb structure attached to a lower end of said frame and including a plurality of parallel, elongated, linear second teeth arranged in a spaced manner for receiving the matrix array of rodlets, wherein each of said second teeth is disposed intermediate two or more of the rodlets, and wherein said first and second teeth are oriented generally transversely; and
   control means attached to an upper portion of said frame and coupled to said second movable comb structure for displacing said second comb structure between a first position wherein said first and second comb structures are non-overlapping and said second teeth are removed from the matrix array of teeth and a second position wherein said first and second comb structures are overlapping and each of said first and second teeth are disposed intermediate two or more of the rodlets, and wherein each of the rodlets is maintained in fixed position relative to the other rodlets by adjacent pairs of first and second teeth.

2. The apparatus of claim 1, wherein said frame includes an upper mounting bracket for attaching said apparatus to a wall of a spent fuel pool.

3. The apparatus of claim 2, wherein said mounting bracket includes a positioning bracket for engaging an outer surface of the wall of said spent fuel pool.

4. The apparatus of claim 1, wherein said control means includes a rotatable shaft having a handle at an upper end and coupled at a lower end thereof to said second movable comb structure.

5. The apparatus of claim 4 further comprising drive linkage coupling a lower end of said rotatable shaft to said second movable comb structure.

6. The apparatus of claim 4, wherein said frame includes an upper mounting bracket and a lower fixed plate, and wherein said rotatable shaft is pivotally coupled to said upper mounting bracket and to said lower fixed plate.

7. The apparatus of claim 1, wherein each of said teeth has a pointed distal end.

8. The apparatus of claim 7, wherein each of said first and second comb structures includes a plurality of inner teeth and a plurality of outer teeth, and wherein said inner teeth are longer than said outer teeth.

9. The apparatus of claim 7, wherein each of said first and second comb structures further includes respective tapered outer portions for facilitating insertion of said rodlets in said comb structures.

10. Apparatus for aligning rodlets of a nuclear fuel assembly insert, wherein said rodlets are suspended from a support hub and are arranged in a matrix array, said apparatus comprising:
- a frame including an upper mounting bracket and a lower fixed plate;
- a first fixed comb structure attached to a lower end of said frame and including a plurality of parallel, elongated, linear first teeth arranged in a spaced manner for receiving the matrix array of rodlets, wherein each of said first teeth is disposed intermediate two or more of said rodlets;
- a second movable comb structure attached to a lower end of said frame and including a plurality of parallel, elongated, linear second teeth arranged in a spaced manner for receiving the matrix array of rodlets, wherein each of said second teeth is disposed intermediate two or more of the rodlets, and wherein said first and second teeth are oriented generally transversely, wherein said first fixed comb structure is formed in said lower fixed plate and said second movable comb structure is attached to said lower fixed plate in a sliding manner; and
- control means attached to an upper portion of said frame and coupled to said second movable comb structure for displacing said second comb structure between a first position wherein said first and second comb structures are non-overlapping and said second teeth are removed from the matrix array of teeth and a second position wherein said first and second comb structures are overlapping and each of said first and second teeth are disposed intermediate two or more of the rodlets, and wherein each of the rodlets is maintained in fixed position relative to the other rodlets by adjacent pairs of first and second teeth, said control means including a rotatable shaft and drive linkage coupling a lower end of said rotatable shaft to said second movable comb structure.

11. The apparatus of claim 10 further comprising alignment means attached to said lower fixed plate and engaging said second comb structure for maintaining said comb structures in generally transverse alignment.

12. The apparatus of claim 11, wherein said alignment means includes a plurality of brackets engaging edges of said second movable comb structure.

13. The apparatus of claim 10, further comprising locking means for locking said second movable comb structure in position when said first and second comb structures are overlapping.

14. The apparatus of claim 13, wherein said locking means includes apertures in said second movable comb structure and said lower fixed plate for receiving a locking pin when said first and second comb structures are overlapping and said apertures are aligned.

15. The apparatus of claim 13 further comprising first and second stop means for limiting displacement of said second movable comb structure in the overlapping and the nonoverlapping positions, respectively.

16. The apparatus of claim 15, wherein said first and second stop means comprise first and second brackets, respectively, attached to said lower fixed plate.

* * * * *